United States Patent [19]

Furutu

[11] 4,198,772
[45] Apr. 22, 1980

[54] BINDING STRAP

[75] Inventor: Akira Furutu, Tokyo, Japan

[73] Assignee: Japan Banoc'k Co., Ltd., Tokyo, Japan

[21] Appl. No.: 894,707

[22] Filed: Apr. 10, 1978

Related U.S. Application Data

[63] Continuation of Ser. No. 749,897, Dec. 13, 1976, abandoned.

[30] Foreign Application Priority Data

Sep. 4, 1976 [JP] Japan .................. 51/119060[U]

[51] Int. Cl.² .............................................. G09F 3/14
[52] U.S. Cl. ..................... 40/21 R; 40/302; 292/318
[58] Field of Search ............. 24/216, 217, 16 PB, 24/219, 213 R, 248 R, 248 SL, 30.5 P; 292/325, 307 A, 318–322; 40/20 R, 20 A, 21 C, 300, 302, 304

[56] References Cited

U.S. PATENT DOCUMENTS

| | | | |
|---|---|---|---|
| 2,010,583 | 8/1935 | Canter | 24/30.5 P |
| 2,368,100 | 1/1945 | Boenecke | 24/216 |
| 3,144,695 | 8/1964 | Budwig | 24/16 PB |
| 3,735,765 | 5/1973 | Ichelson | 24/248 SL |
| 4,042,267 | 8/1977 | Clinch et al. | 292/318 |

FOREIGN PATENT DOCUMENTS 875935  8/1961  United Kingdom ............ 24/16 PB

*Primary Examiner*—Kenneth Dorner
*Attorney, Agent, or Firm*—Armstrong, Nikaido, Marmelstein & Kubovcik

[57] ABSTRACT

A binding strap suitable for use as indication tag for various purposes is provided.

The binding strap is made of a synthetic resin in a body and has a folding portion at the center, a hole with fastening pieces at one side and a projection to be inserted and fastened in the hole at another side.

The binding strap of the present invention may be easily and certainly attached to an article at one touch with an empty hand by thrusting it through an opening of the article, folding it and inserting the projection into the hole. The binding strap of the present invention has a guide fluke at the end portion in order to easily thrust it through an opening of an article.

1 Claim, 11 Drawing Figures

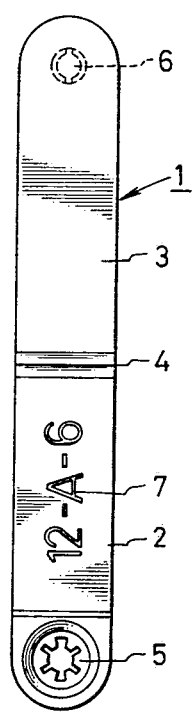
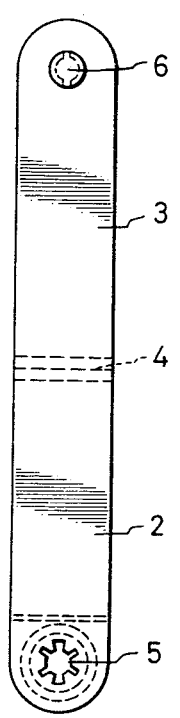
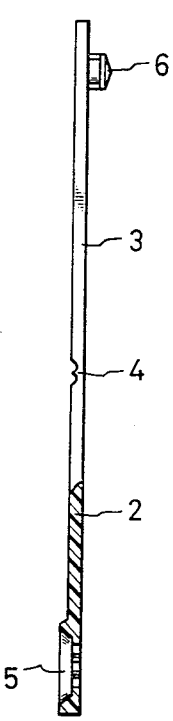
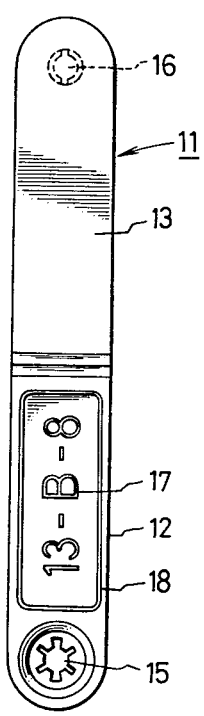
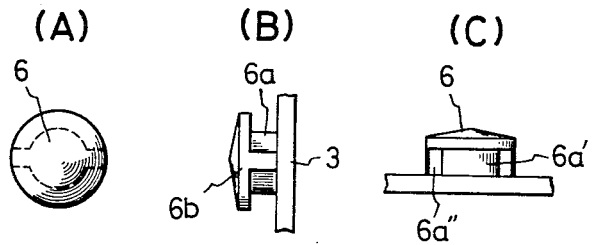
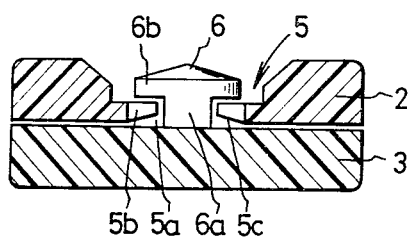

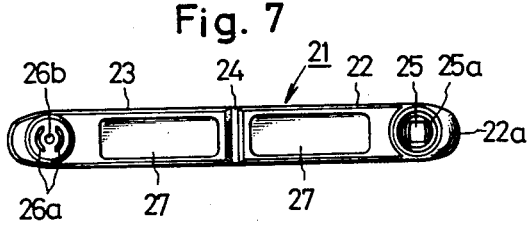
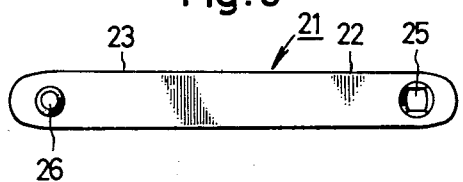
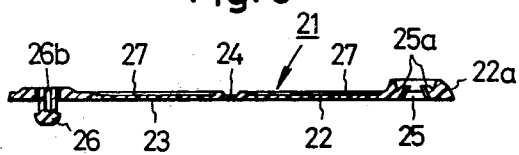
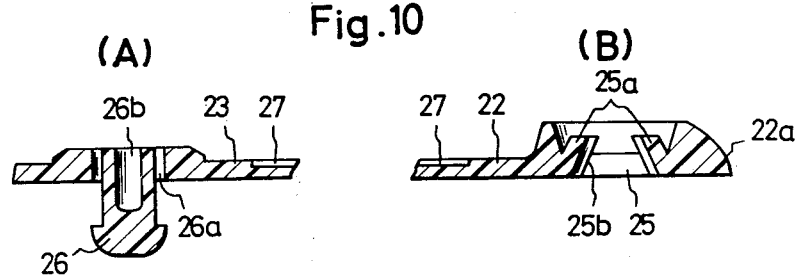
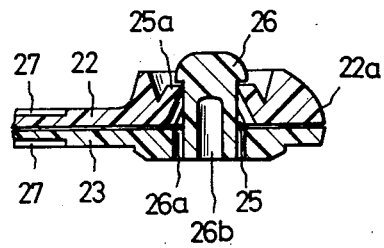

BINDING STRAP

This is a continuation of application Ser. No. 749,897, filed Dec. 13, 1976 and now abandoned.

BACKGROUND OF THE INVENTION

The present invention relates to a binding strap and, especially, relates to a binding strap made of a synthetic resin suitable for use as indication tag.

Usually, when subjecting furs and the like to various treatments, indication tags are used in order to distinguish their sorts, their qualities, their sources of their other characteristics.

Heretobefore, when treating mink, indication tags made of aluminium have been used. In this case, the tag is thrusted through the eye portion of fur and folded and then a projection at one terminal is inserted into a hole at another terminal and the projection is bended to fasten. However, such a metal tag has various disadvantages. For instance, the manufacture is quite difficult and, sometimes, it flaws the fur and the processability is inferior because some special tool has to be used in order to attach it.

An object of the present invention is to solve such conventional disadvantages.

An other object of the present invention is to provide a binding strap which can be easily attached to an article at one touch with an empty hand without any specific tool.

An other object of the present invention is to provide a binding strap which can be easily manufactured by monobloc molding of synthetic resin.

An other object of the present invention is to provide a binding strap which can be easily thrusted through an opening of article, such as the eye portion of mink, without damaging the article, at one touch with an empty hand and safely and certainly attached thereto.

A further object of the present invention is to provide a binding strap which can be used as a classification mark or a discrimination mark by giving indication by means of letters or signs onto the surface thereof.

The foresaid objects and other objects and advantages of the present invention will become more apparent from the following description.

SUMMARY OF THE INVENTION

The binding strap of the present invention is wholely made of a synthetic resin in a body and has a folding portion at the center, a hole with fastening pieces at one side and a projection to be inserted and fastened in the hole at another side.

The binding strap of the present invention is usually in the long, slender and flat form as a whole and used as an indication tag with various indication on the surface. It is easily and certainly attached to an article at one touch with an empty hand by thrusting through an opening of the article, folding at the center and inserting the projection into the hole.

The hole in the binding strap is provided with elastic fastening pieces around it in a body and each of the fastening pieces is usually in the form of tongue or projective brim. On the other hand, the projection at another side of the binding strap is usually provided with a greater head at the tip thereof. When inserting the projection in the hole, the head extends elastically the fastening pieces, and after entirely inserting the head, the fastening pieces return to normal, and thereby the projection is certainly fastened.

The binding strap has preferably a guide fluke at the end portion in order to easily thrust it through an opening of an article.

BRIEF DESCRIPTION OF THE INVENTION

FIG. 1 is a front view of one embodiment of the binding strap of the present invention.

FIG. 2 is a back side view of the binding strap shown in FIG. 1.

FIG. 3 is a cross-sectional side view of the binding strap shown in FIG. 1.

FIGS. 4A, 4B and 4C are a plane view, a right side cross-sectional view and a front view of the first joining portion or the projection of the binding strap, respectively.

FIG. 6 is a cross-sectional view showing the condition in which the first joining portion or the projection and the second joining portion or the hole are joined each other.

FIG. 5 is a front view of another embodiment of the binding strap of the present invention.

FIG. 7 is a front view of still another embodiment of the binding strap of the present invention.

FIG. 8 is a back side view of the binding strap shown in FIG. 7.

FIG. 9 is a cross-sectional view of the binding strap shown in FIG. 7 in the longitudinal direction.

FIGS. 10A and 10B are cross-sectional views of the second joining portion and the first joining portion in detail, respectively.

FIG. 11 is a cross-sectional view showing the condition in which the second joining portion shown in FIG. 10A and the first joining portion shown in FIG. 10B.

DESCRIPTION OF PREFERRED EMBODIMENT

In FIGS. 1 through 3, in which first embodiment of the binding strap of the present invention is shown, the binding strap 1 is wholely manufactured by molding a synthetic resin in a body and composed of first portion 2 and second portion 3. Thin folding portion 4 is at the center or the joining portion of them, and the first portion 2 and the second portion 3 are piled up each other by folding the folding portion 4.

As raw materials for manufacturing the binding strap, any kinds of synthetic resins may be used. Among them, nylon is a most preferable resin and other flexible synthetic resins such as polypropylene and polyethylene are also preferable.

In the first portion 2, first joining portion 5, at which tongue shaped pieces are arranged circularly, is provided and in the second portion 3, second joining portion 6 having a projection in accordance with the first joining portion 5 is provided.

As shown in FIGS. 4A, 4B and 4C, at the second joining portion 6, pillar 6b and head 6a' are provided and the piller 6a is composed of cylindrical portion 6a' and wall 6a" overhung to both sides thereof.

The first portion 2 is a portion at which indication 7 with letters, symbols and the like is given by optional means.

As means for giving indication 7, various means such as printing and embossing can be used.

When using the binding strap 1, it is thrusted through an opening of an article and is folded at the folding portion 4 and then the first joining portion 5 and the second joining portion 6 are joined each other as shown in FIG. 6.

In this case, the head 6b of the second joining portion 6 is pushed into the fastening tongue shaped pieces 5b which are overhung around the hole 5a to be fastened. The fastening piece 5b has inclined lower part 5c so as to easily push the conical head 6b of the second joining portion into the fastening pieces 5b.

In FIG. 5 in which second embodiment of the binding strap of the present invention is shown, first portion 12 of the binding strap 11 has frame portion 18 so as to guard indication 17 and to give an enforcing effect to the first portion 12. The binding strap shown in FIG. 5 is the same as in FIG. 1 but frame portion is provided in the binding strap of FIG. 5.

In the above embodiments, indication is given only at the first portion 2, 12, but indication can be also given at the second portion 3, 13 and also given by coloring the binding strap 1, 11.

In FIGS. 7 through 11 in which third embodiment of the binding strap of the present invention is shown, hole 25 having elastically entendible projective brims 25a or first joining portion is provided near the terminal of first portion 22 of the binding strap 21 as shown in FIGS. 10A and 10B, and projection 26 or second joining portion is provided near the terminal of second portion 23 in accordance with the hole 25. When folding the binding strap 21 at folding portion 24, the projection 26 is inserted and fastened in the hole 25. The fastening projective brim 25a of the hole 25 has inclined lower part 25b so as to easily insert the projection 26. At the projection 26, crescent shaped gap 26a, which makes rapping easy after molding, and inner hole 26b, which increases elasticity when inserting into the hole 25 and prevents contraction, are preferably provided. The inner hole 26b can be omitted.

The binding strap has guide fluke 22a having a semi-cylindrical dome or concave wedge shape at the end portion of the first portion 22 in order to easily thrust it through an opening of an article such as the eye portion of fur. The guide fluke can be given not only at the end of first portion 22 but also at the end of second portion 23 or can be given at the end of second portion 23 only.

On both surfaces of the first portion 22 and the second portion 23, indication 27 is given in order to use as an indication tag.

When using the binding strap 21 of this embodiment, the binding strap 21 is thrusted through an opening of an article by inserting the guide fluke 22a of the first portion thereto and is folded at the folding portion 24 and then, as shown in FIG. 11, the projection of the second portion 23 is inserted into the hole 25 of the first portion 22 to be fastened.

Of course, when using the binding strap having a guide fluke at the second portion 23, it is inserted from the guide portion. In this embodiment, it is quite easy to thrust the binding strap through an opening of the article by the action of the guide fluke 22a at the end portion thereof, so that even when the binding strap 21 is thrusted through a narrow opening such as an eye portion of fur, it does not damage to the body. Moreover, the binding strap of this embodiment shows more preferable joining property and is more easily molded in comparison with those of the above two embodiments.

The binding strap 1, 11 and 21 can also be used as a hanger. For instance, holes are made in both of the first portion 2, 12, 22 and the second portion 3, 13, 23 of the binding strap of the present invention and the holes are utilized for hanging articles.

According to the present invention, as mentioned above, the binding strap can be easily manufactured by monobloc molding of synthetic resin and can be easily thrusted through an opening of an article at one touch with an empty hand without any special tool to be safely and certainly attached thereto and can be used as a classification mark or a discrimination mark by giving indication mark by giving indication by means of letters or signs onto the surface thereof.

Moreover, the binding strap of the present invention can be utilized for hanging articles or for other various uses.

What is claimed is:

1. A binding strap for use in tagging fur pelts by connection to an opening in the pelt, such as an eye-socket, comprising a one-piece molding of a flexible synthetic resin having a substantially thin, elongated strip-like body including continuous first and second body portions connected by a thin folding portion, at least one of said first and second portions having a guard frame on a surface thereof on which an indication is given, the folding portion being a portion of the synthetic resin having a thickness less than that of said first and second body portions, said first body portion having a first joining portion disposed at the end thereof opposite the folding portion and being an aperture having elastically extendible projective brims on the inner periphery thereof; and said second body portion having a second joining portion disposed at the end thereof opposite the folding portion and adapted to cooperate and lock with said first joining portion to fasten said binding strap, said second joining portion being a projection having a substantially cylindrical portion having a hollow projection therein, said cylindrical portion being connected at a base thereof to said second body portion, crescent-shaped apertures being provided around the base, said cylindrical portion being connected at the other end thereof to a head portion, said head portion having a diameter greater than that of said cylindrical portion, said first and second joining portions being permanently attached to said first and second body portions, respectively, and at least said first body portion is provided with a guide fluke at an end portion thereof, said guide fluke being in the form of a dome-shaped wedge having a sloped portion which becomes gradually thinner toward the end thereof, said sloped portion extending continuously from an upper wall edge of said first joining portion to the end of said guide fluke.

* * * * *